June 8, 1965      W. H. FUSS      3,188,382

EXPLOSION PROOF JOINT FOR ELECTRICAL CONDUIT

Filed Feb. 14, 1963

INVENTOR.
WILLIAM H. FUSS
BY
Cullen, Sloman & Cantor
ATTORNEYS

United States Patent Office 3,188,382
Patented June 8, 1965

3,188,382
EXPLOSION PROOF JOINT FOR ELECTRICAL CONDUIT
William H. Fuss, 5338 Redan Road, Stone Mountain, Ga.
Filed Feb. 14, 1963, Ser. No. 258,579
1 Claim. (Cl. 174—93)

This application relates to electrical fittings and particularly to gas-tight explosion proof sealable unions for joining electrical conduit pieces end to end and sealing the same.

Fittings for this purpose have been known but the same generally comprise two separate and independent assemblies, one assembly serving as a union and the other assembly serving as a repository for sealing compound for sealing the conduit. In this application, I disclose a device comprising a single unitary assembly which serves as a union and at the same time serves as a repository for sealing compound and which is formed in a manner to enable assembly for coupling and sealing in an easy manner and at the same time enables the device to be opened up for inspection or for removing the sealing compound when desired.

Still other objects and advantages of the device of the invention will best be understood upon reference to the appended drawing which shows a preferred embodiment of such device.

Figure 2:
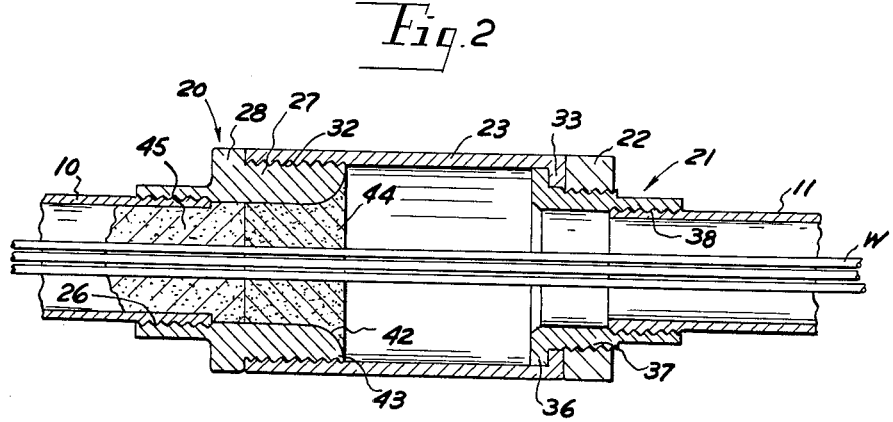
Figure 3:
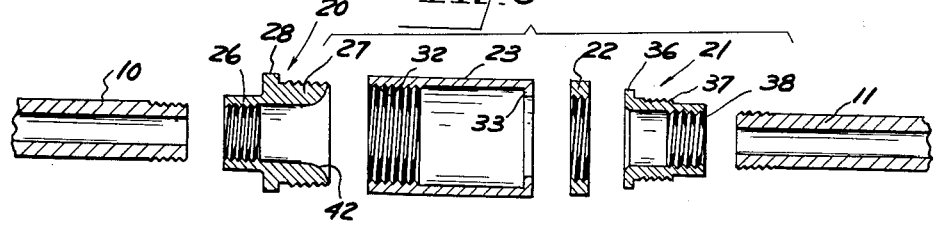
Figure 1:
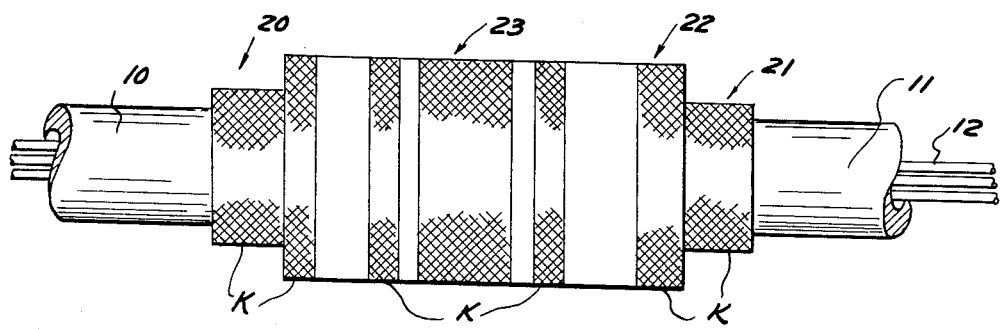

In these drawings:
FIG. 1 is an elevation view of the parts in assembly.
FIG. 2 is a cross section view of the union fitting with the parts in assembly.
FIG. 3 is an exploded view of the parts.

In these drawings, while the fitting is shown in a horizontal position for purposes of convenience, in most instances it will, in actual use, be mounted vertically.

Referring to the drawings, it will be seen that the union or fitting hereof, provided for joining electrical conduit pieces 10 and 11 end to end with the conductors 12 passing through the fitting, comprises three rings 20, 21 and 22 and a sleeve 23. All of the parts are ring form or cylindrical.

The first ring 20 has an internally threaded part 26 for receiving the externally threaded conduit end 10 and also has an externally threaded sleeve-joining part 27 with a knurled flange 28 between parts 26 and 27.

Sleeve 23 has a first end part 32 internally threaded for receiving the externally threaded part 27 of the first ring 20 and also has a second end part 33 internally flanged as shown.

The second ring 21 has an externally flanged end part 36 inside the sleeve and against the flange 33 of the sleeve and also has an externally threaded part 37 outside the sleeve and also has an internally threaded part 38 also outside the sleeve for receiving an externally threaded conduit end 11.

The third ring 22 is an internally threaded locking ring 22 which is threaded on the externally threaded part 37 of the second ring 21 and against the flanged end 33 of the sleeve 23 for locking the parts in assembly.

The externally threaded part 27 of the first ring is bevel-bored or tapered as shown at 42 in a direction expanding away from the conduit end 10 and towards the conduit end 11 to expose to view all but a fine edge 43 of ring part 27 when sleeve 23 is removed from ring 20. Bore 42 is much larger in diameter than conduit 10 so as to be easily filled and to contain a commonly used fluid self-hardening sealing compound 44 visible at the sleeve-joining end of ring 20 when ring 20 and its associated conduit end 10 are exposed by the removal of the sleeve 23 from ring 20.

The various parts are externally knurled at various points K to facilitate manipulation.

The device is used and assembled as follows:

Assuming two conduit ends 10 and 11 are axially alined and longitudinally spaced a proper distance with conductor wires W to be run through the conduit ends and to be exposed in the gap between such conduit ends, the first step is to thread ring 20 onto conduit end 10 and then thread the assembly of sleeve 23, rings 21 and 22, on conduit end 11. Then, the wires W are run through the conduit. Thereafter, with sleeve 23 retracted from ring 20, the latter and conduit end 10 are packed with a fibrous packing 45 conventionally used in this art, and then the bevel-bore 42 is filled with fluid sealing compound 44, the packing serving as a plug to hold the fluid sealing compound in place in the ring 20 until it hardens. The feathered edge 43 of ring 20 facilitates the smoothening of the fluid sealing compound in the ring 20 and also provides maximum exposure to view of the sealing compound in bore 42.

Then, sleeve 23 is threaded onto ring 20 after which locking ring 27 is tightened up to complete the assembly.

When locking ring 27 is loosened up, sleeve 23 may be drawn away from ring 20 to expose the sealing compound at 44 in ring 20. The seal can easily be inspected and verified simply by retracting sleeve 23.

The device is short in overall length and may be manipulated in crowded quarters because of the truly cylindrical nature of all of the parts. Conduit ends to be coupled by the device are not required to be in end to end abutting relation but there can and should be a substantial longitudinal gap between conduit ends determined by the length of the sleeve provided.

It is easy to pack the ring 20 with the packing required to prevent the fluid sealing compound running down the conduit past such packing and the packing and sealing are made easier because the area in which the packing and sealing are packed is visible during the packing operation.

Likewise, the filling of the bevel-bore of the ring 20 with the soupy sealing compound is easy because the bevel-bore is accessible when the sleeve is retracted and is fully visible. This factor also enables the hardened sealing compound to be chipped out easily when desired for withdrawal of wires from the conduit.

While the preferred form is as shown, the sleeve 23 may in some instances be formed with a lateral opening for enabling sealing material to be poured into the assembled fitting, with such opening threaded and closed by a threaded plug. This feature is old and well known in the art of sealable fittings and may if desired be utilized here.

The device is a unitary sealable union or fitting as contrasted from devices of the prior art which require separate elements, a first element for providing a location for sealing compound and a second element for functioning as a union. Here all functions are provided in one assembly which is not only a union fitting but is also a repository for sealing compound to make the device explosion proof as a gas tight explosion proof fitting.

The feathered edge of the bevel-bore of the ring 20 provides a convenient abutment for feathering off or smoothening the sealing compound as it hardens with a putty knife or trowel or the like being used to provide a neat and clean filling of sealing compound in the ring 20. It is a very easy matter, because of the complete accessibility of ring 20, to fill ring 20 with sealing compound in soupy condition by the use of a knife or trowel of small size with the sealing compound filled against the packing already inserted into ring 20.

The device complies with the Electrical Code because it enables easy and satisfactory filling of the device with sealing compound for the purpose of preventing the passage of gases, vapors and flame from one part of an electrical installation to another through a conduit.

The requirement for inspection is easily satisfied. After the installation is completed the sleeve 23 may be retracted to expose the seal and thus provide for easy inspection of the seal.

An important characteristic of the device is that all of the parts are truly cylindrical and there are no side branches or stubs common in devices previously used for the purposes.

Because thread 26 terminates between the ends of ring 20, conduit 10 can enter such ring only part way. This positively insures a long enough seat in ring 20 for compound 44, between the right end of conduit 10 and the right end of ring 20, to hold compound 44 in place.

Now having described the electrical fitting herein disclosed, reference should be had to the claim which follows.

I claim:

A gas tight explosion proof sealable union joining electrical conduit pieces end to end and sealing same comprising a plurality of rings and a cylindrical sleeve; there being a first ring having an internally threaded part receiving an externally threaded conduit end and an externally threaded sleeve joining part; the internal thread of the first ring terminating between the ends of such ring so that the conduit may be inserted only part way into such ring to leave a gap between the end of the conduit and the far end of such ring; with the first ring having an external flange at the far end of the external thread; the sleeve having a first end part internally threaded receiving the externally threaded sleeve joining part of the first ring and having an internally flanged second end part; the external flange of the first ring stopping the sleeve on such ring; there also being a second ring having an externally flanged end part inside the sleeve and against the flange of the sleeve and also having an externally threaded part receiving an internally threaded conduit end;

said second ring also having an externally threaded part outside the sleeve, the device including an internally threaded locking ring threaded on the second named externally threaded part of the second ring and against the flanged end of the sleeve locking the parts in assembly;

the externally threaded part of the first ring containing a sealing compound between the end of the conduit therein and the far end of such ring visible at the sleeve joining end of such ring when such end of such ring is exposed by the removal of the sleeve from such rings;

the externally threaded part of the first ring being bevel bored or tapered at its far end;

with such compound filling the bevel-bore or taper in such part of such ring.

References Cited by the Examiner

UNITED STATES PATENTS

| | | | |
|---|---|---|---|
| 428,046 | 5/90 | Hanagin | 174—91 X |
| 1,063,827 | 6/13 | Mullin | 174—91 X |
| 2,451,413 | 10/48 | Robinson | 174—88 X |

FOREIGN PATENTS

| | | |
|---|---|---|
| 567,618 | 2/45 | Great Britain. |

JOHN F. BURNS, *Primary Examiner.*

JOHN P. WILDMAN, *Examiner.*